Sept. 29, 1964      R. COUZENS ETAL      3,150,575
METHOD AND MEANS FOR MAKING SPIRALLY WOUND CONTAINERS
Filed Aug. 29, 1962      6 Sheets-Sheet 1

Inventors
Reginald Couzens
Francis G. Glasby
By their attorneys
Howson and Howson

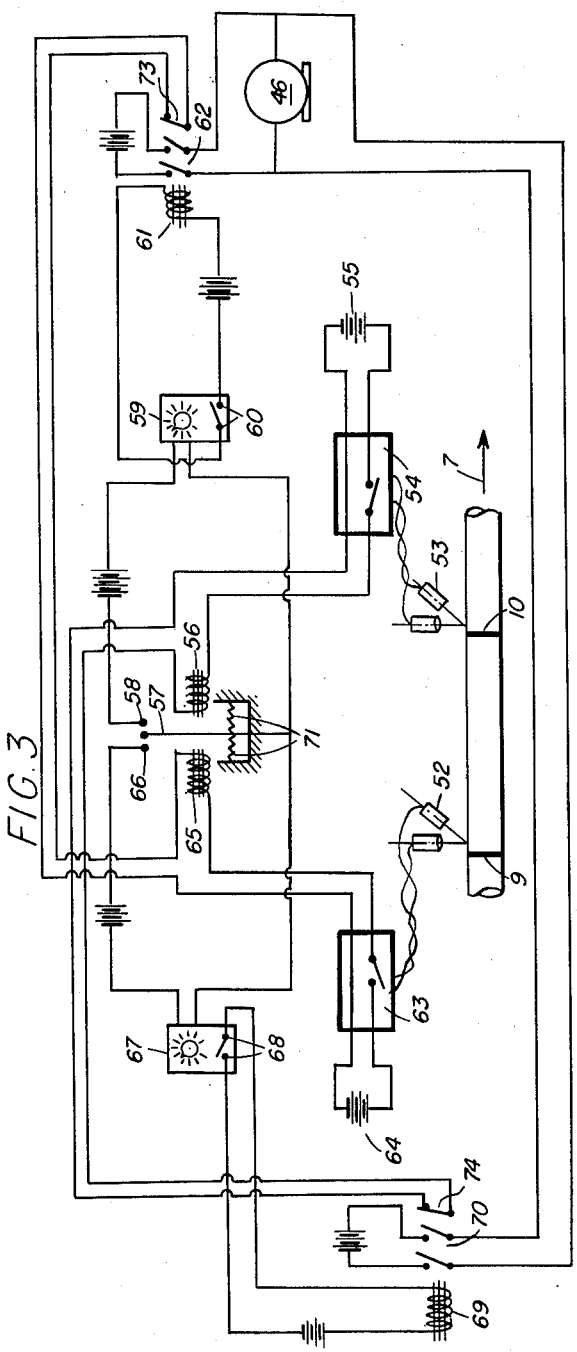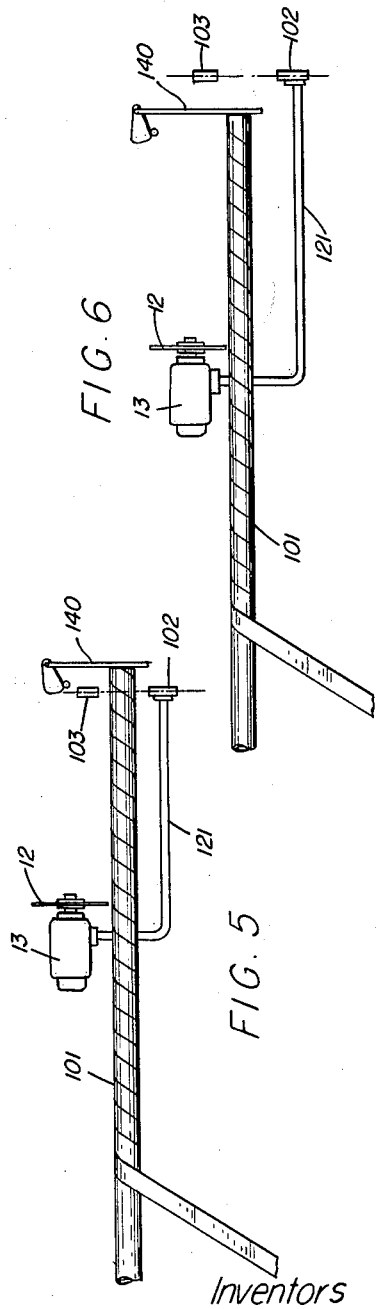
Inventors
Reginald Couzens
Francis G. Glasby
By their attorneys
Howson and Howson

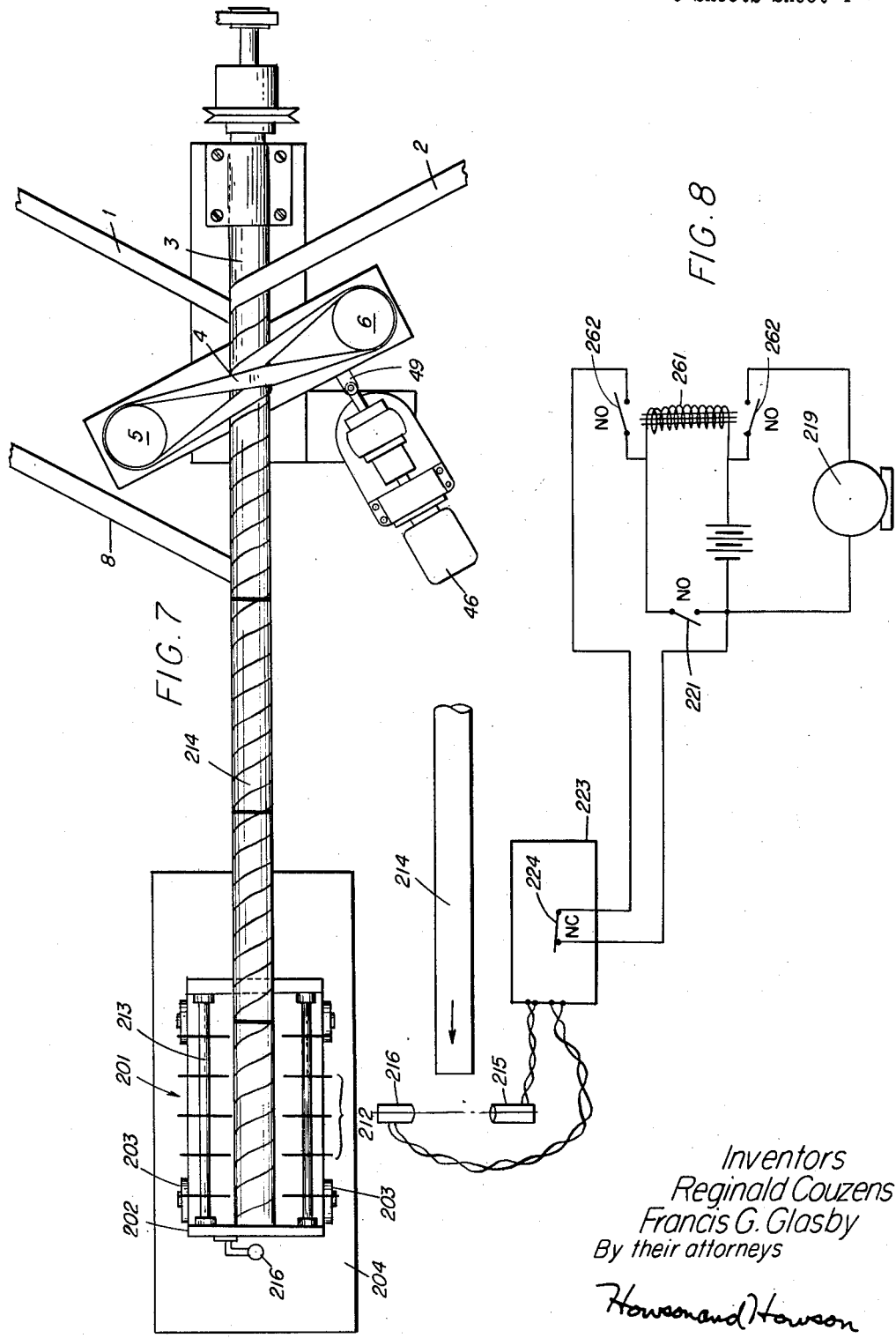

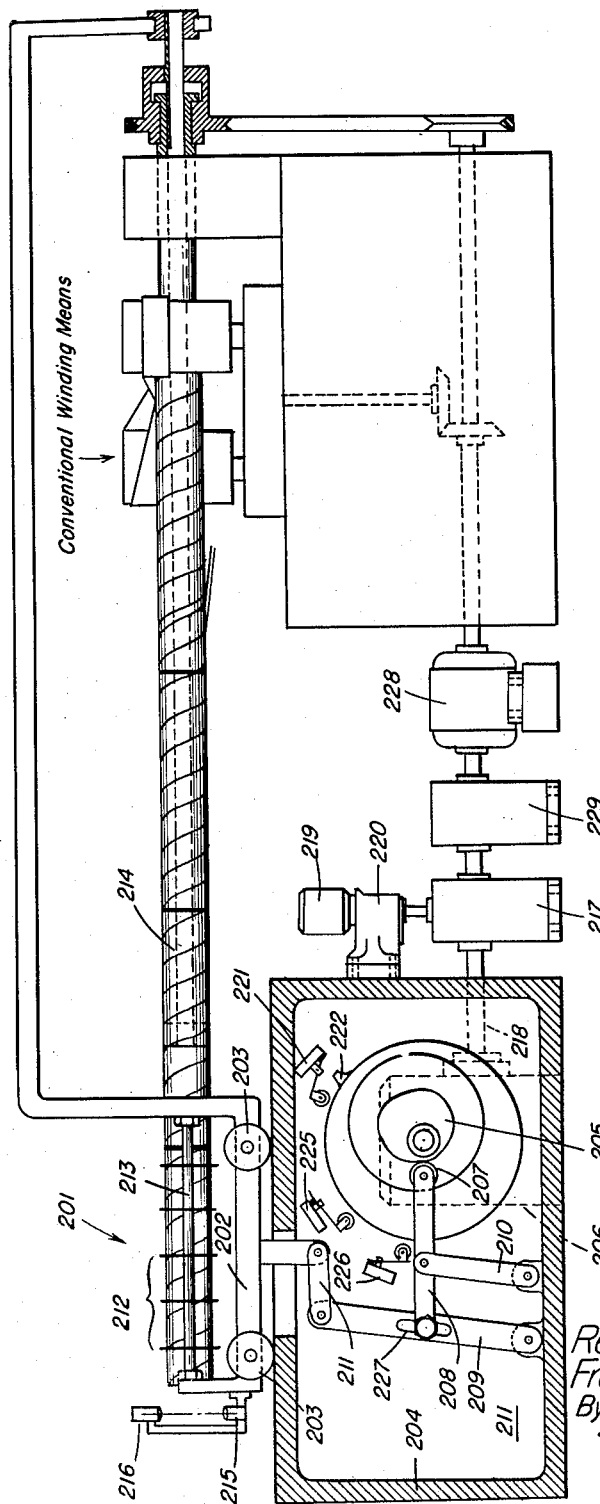

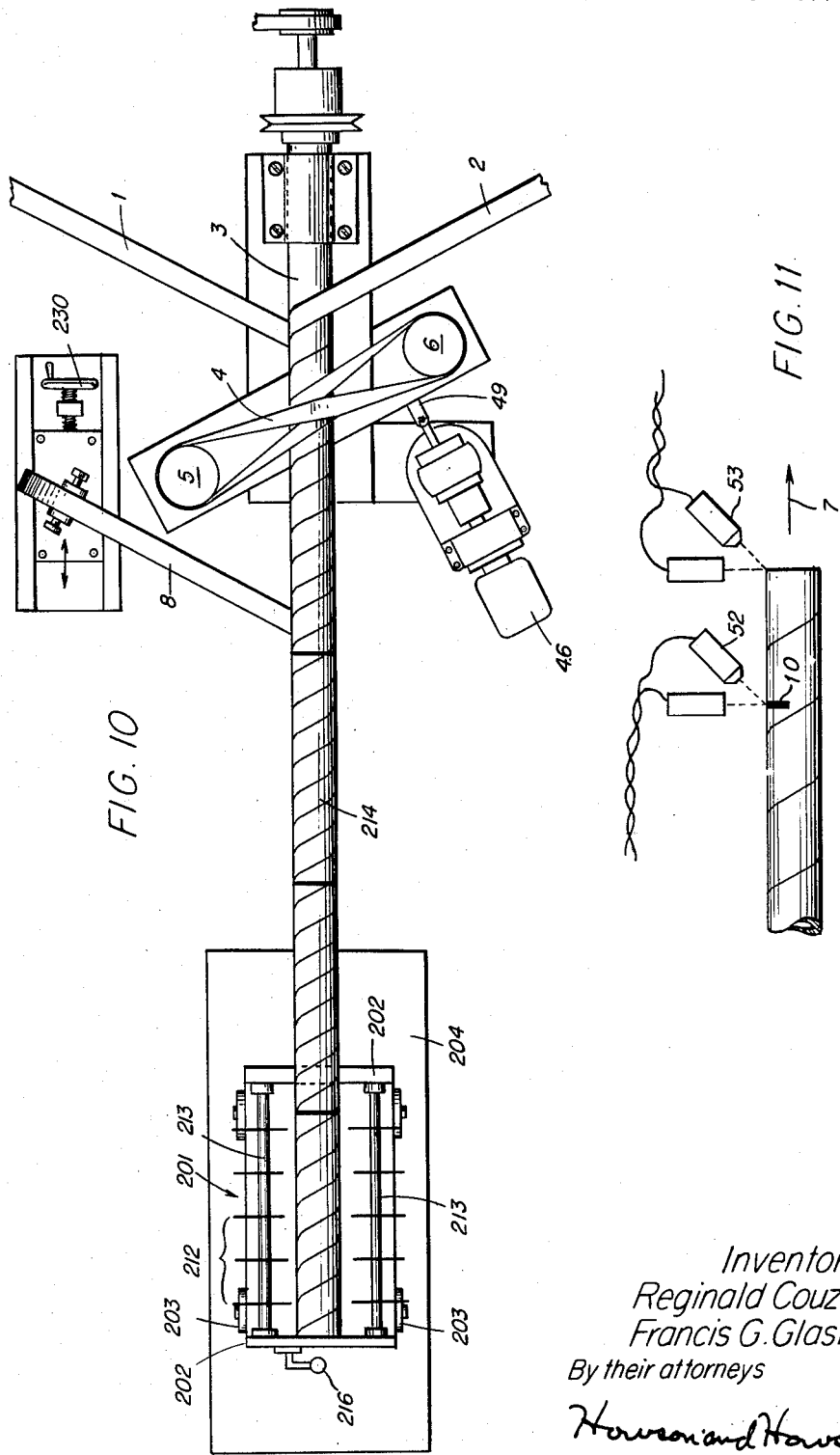

United States Patent Office 3,150,575
Patented Sept. 29, 1964

3,150,575
METHOD AND MEANS FOR MAKING SPIRALLY WOUND CONTAINERS
Reginald Couzens, Wallingford, Pa., and Francis G. Glasby, Chesterfield, England, assignors to Robinson & Sons Ltd., Chesterfield, England, a company of Great Britain
Filed Aug. 29, 1962, Ser. No. 220,595
17 Claims. (Cl. 93—80)

This invention relates to containers having unitary patterns spirally wound on the outside and more particularly to method and means for keeping the unitary patterns in proper relation to the length of the container and the container of proper length in spite of any errors which may occur in making the containers. In making spirally wound containers with unitary patterns, errors in length of the containers and winding errors develop as the tubing is wound and the tube or individual containers are cut off, causing misregister of pattern. The obtaining of complete accuracy in pattern registry in spite of these cutting and winding errors has been a problem to the tube-making industry. According to the present invention the errors are stabilized and controlled in such a way as to enable heavy fast moving winding machines to obtain increased accuracy.

It has been realized by applicants that the principal error to be dealt with is what may be termed "pitch error." Pitch may be defined as the space occupied from one unitary spirally wound pattern to the next axially lengthwise of the tube. It is characteristic of the present invention that the pitch error of the pattern is measured and corrected separately from all the other winding errors. In this way each unitary pattern is kept in perfect registry with itself and other characteristics of the invention enable those patterns to be in registry with the ends of the containers.

In the case of the first embodiment of the drawings two observing means, such for example as electric eyes, observe on the wound tube simultaneously spaced at a distance related to the correct axial pitch length. This has the effect of measuring the pitch by an independent standard. The machine makes correction of pitch error from this observation. It is equally useful on single cut or gang cutting machines and whether the machines are of the trigger or continuous type. In another embodiment of the invention the measurement is made from the end of the tube towards the winding point of the pattern strip. This gives a standard, i.e., fixed length container. An alternative to this latter technique would be to allow the machine to continue to cut to a constant length basis and to vary the spacing of the two electric photo cell observing units so as to vary the reference standard by which the pitch of the tube is being measured. This has the effect of controlling the pitch so as to match the cutting length compared with the practices earlier described of controlling the pitch to an independent standard. It will be observed that both techniques or practices result in stabilizing the pitch quality of the tube by matching the cutting length of the spiral with the independent fixed standard determined by the two observation points.

A further feature of the invention consists of the manner in which the cutting errors are dealt with separately from the pitch error. This feature makes the cutting errors almost non-existent.

In the drawings

FIG. 3 is a diagram of the electric circuitry for FIGS. 1 and 2.

Figure 1:
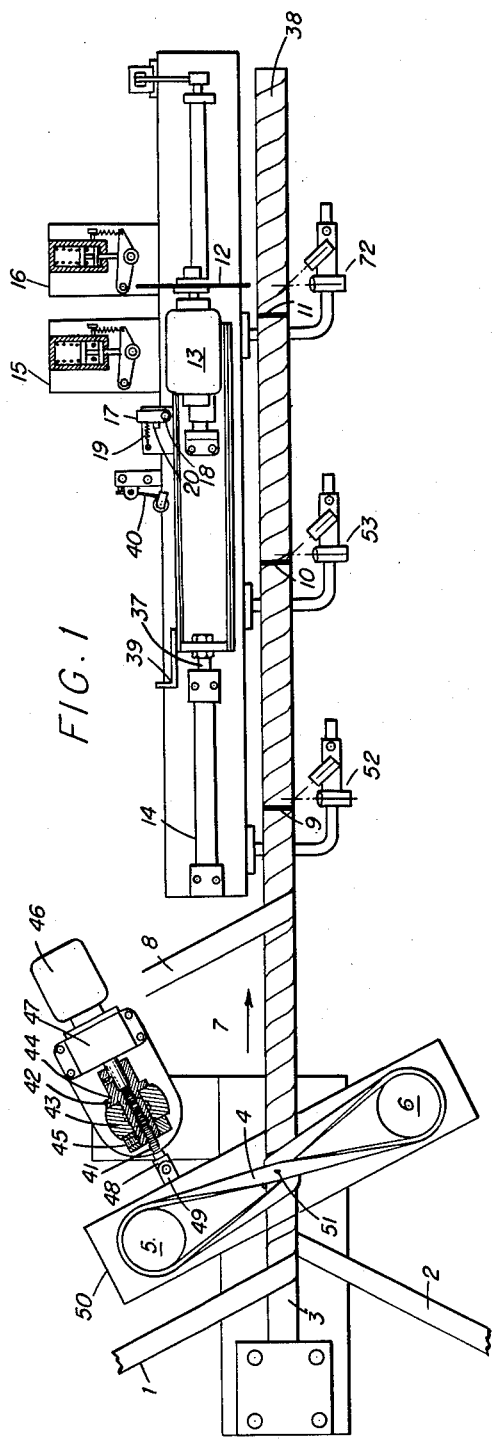
FIG. 1 is a diagrammatic plan view of spiral winding machine modified in accordance with the present invention and containing a double electric eye to stabilize the pitch, the machine being of the trigger-operated single saw type.
Figure 2:
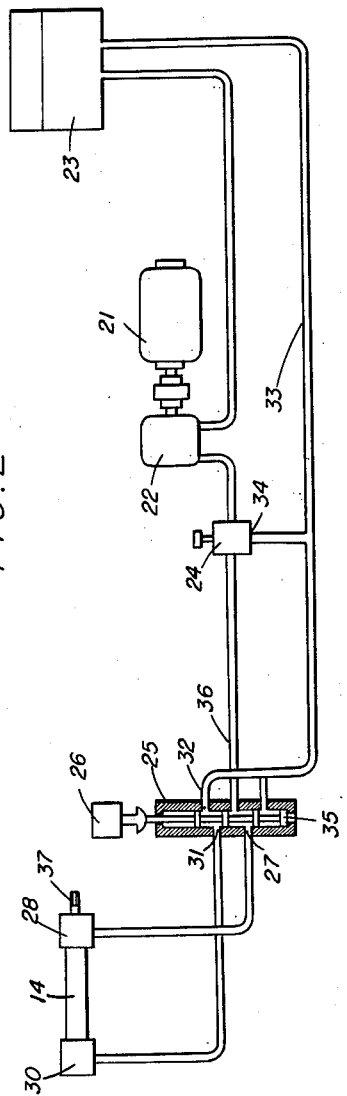
FIG. 2 is a diagrammatic view of the means for reciprocating the saw of FIG. 1 axially of the tube during the cutting cycle.
Figure 4:
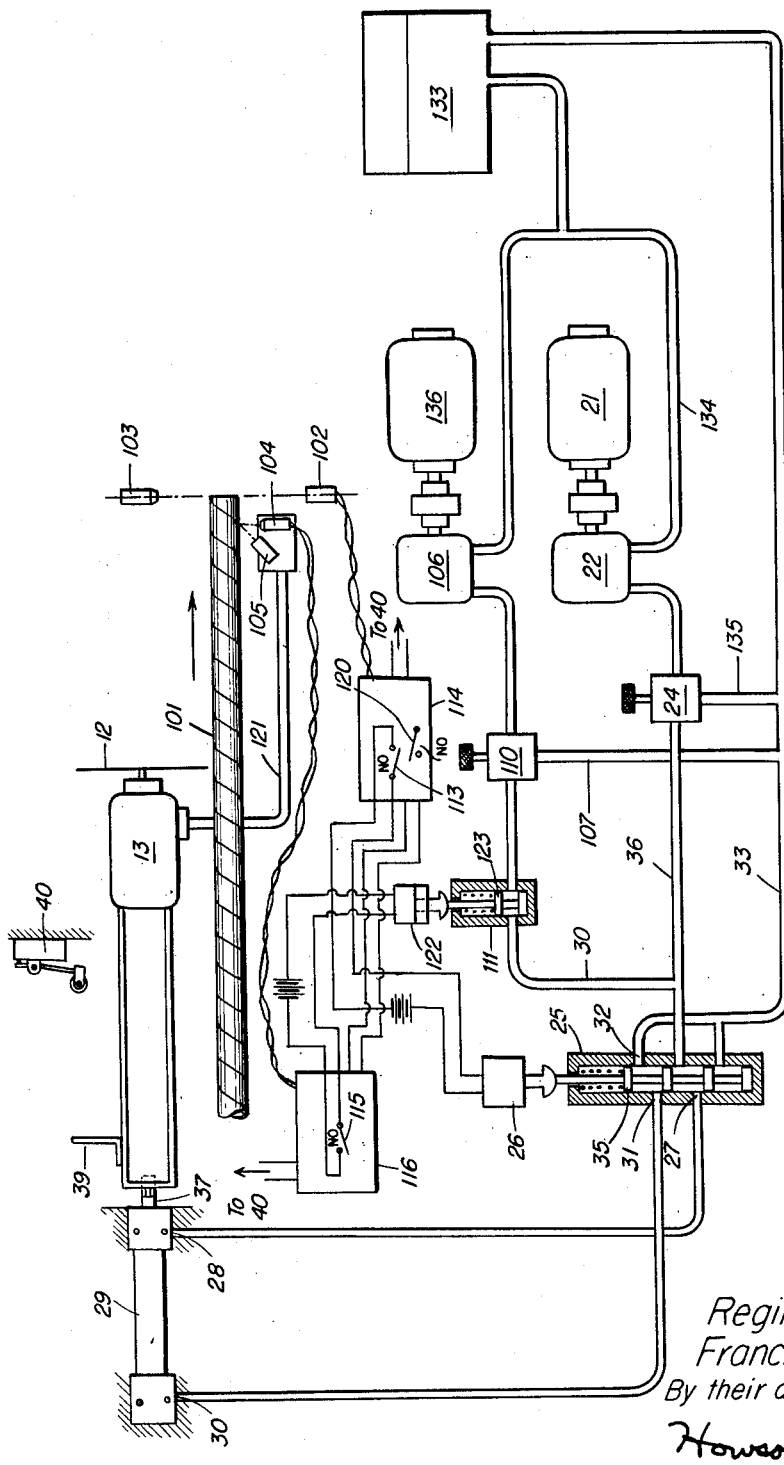
FIG. 4 shows apparatus embodying the invention in which pitch control is combined with a fixed length cutting machine working from the end of the tube using electric eyes and two hydraulic pumps.

FIGS. 5 and 6 show other apparatus embodying the invention in which pitch control such as in FIGS. 1, 2 and 3 is used with a fixed length cutting machine, i.e., working from the end of the tube as in FIG. 4. FIG. 5 shows a flap switch in the path of the end of the tube instead of the primary photo-cell system of FIG. 4, the cut mechanism being such that that cutter traverses at a higher speed than the tube to be cut during the period when both are moving with motion relative to each other toward the cutting point, FIG. 6 shows an apparatus similar to FIG. 4 where the cutter traverses at a lower speed than the tube during the period of relative motion.

FIG. 7 is a diagrammatic plan view of a gang cutting, spiral winding machine with continuous and reciprocating cut off according to the present invention.

FIG. 8 is a diagram of the electric circuitry for the embodiment of FIGS. 7 and 9.

FIG. 9 is a view in elevation of the drive for the embodiment of FIG. 7.

FIG. 10 is a plan view similar to FIG. 7 of an embodiment like that figure with a hand wheel adjustment added.

FIG. 11 shows a modification to FIG. 3 relating to a further embodiment of the invention.

Referring now to the first embodiment of the drawings, FIG. 1 shows a spiral winding machine in elementary form modified according to this invention. Base tube plies 1 and 2 are wound on to a mandrel 3 under the influence of a winding belt 4, motion being imparted by winding belt pulleys 5 and 6, the direction of movement of the being-formed tube being in the direction of arrow 7.

A third strip of ply 8 bearing unitary patterns is wound on to the base tube and it is desired to cut off successive lengths of tube at predetermined locations marked 9, 10 and 11, such points on the tube being repeated in regular fashion as the tube is formed.

The saw 12 driven by motor 13 is so mounted as to be capable of reciprocation axially of the tube by an hydraulic ram 14. During its forward cutting stroke, the saw moved into engagement with the being-formed tube and subsequently was withdrawn therefrom. The saw is returned to its original position without further engaging the tube, such means including switches 15 and 16 which are operable by a trip lever 17 in such a manner that during the forward cutting stroke trip lever 17 operates switch 15, causing the saw to be brought into engagement with the tube and later in the stroke the lever 17 contacts switch 16 causing withdrawal of the saw from the tube during the return stroke. If the strips 1 and 2 are being wound to a pitch of, say three inches axially, the pattern strip applied at a later stage will also conform with this pitch. In matching the winding pitch of the base plies to the pattern strip pitch there will be only a slight difference in helical angle of the successively applied webs due to any increasing diameter of the tube due to build-up. Thus, when the pattern strip is being applied the diameter of the tube is greater by the thickness of the base plies previously wound on.

During the return stroke of the saw the lever 17 must not operate switches 15 and 16. For this purpose the lever 17 is able to pivot about a hinge point 18 when it contacts either switch and passes it. A spring 19 tensions the lever against a stop 20 in order that the lever may operate the switches on the forward cutting strokes.

The means for reciprocating the saw axially of the tube are shown in elementary form in FIG. 2 wherein a motor 21 drives a variable hydraulic pump 22 of variable capacity which receives a supply of oil from a source of supply 23. The pressurized oil supplied by the pump passes through a pressure regulating valve 24 and a line 36 to the inlet side of a solenoid valve 25. This valve is normally in such a position that when a solenoid 26 is de-energized the pressurized oil is allowed to take effect through port 27 leading to a port 28 of an hydraulic cylinder 14. The hydraulic cylinder 14 has a further port 30 at the piston end which, during the de-energized state of solenoid 26, is connected to the ports 31 and 32 of the valve 25 and thence to the return line 33 going to the tank 23. When the solenoid 26 enters the de-energized state and the hydraulic cylinder is in a retracted condition, no oil flow will take place through the solenoid valve 25. At this time the output of the pump 22 will be bypassed through exhaust or bypass 34 of the pressure regulating valve 24 into the return line 33.

When the cutting cycle is initiated by energizing solenoid 26 the spool 35 of the solenoid valve 25 is raised, diverting the oil supply in such manner that the oil supplied from the pump via supply line 36 travels through port 31 to the piston end 30 of the hydraulic cylinder 14 causing the cylinder and its associated piston rod end 37 to extend, so that the saw motor 13 and its saw 12 is traversed axially with the tubing and at the same speed thereof. Means are preferably provided enabling the capacity of hydraulic pump 22 to be adjustable so that its output can be set at a suitable value to insure synchronous speed between the saw 12 and the being-formed tube 38. During the forward stroke the cycle of operations previously referred to for bringing the saw into engagement with and away from the tube are carried out and at the end of the cutting stroke a striking member 39 on the cutter carriage operates upon a switch 40 on the frame of the machine electrically connected to solenoid 26 for the purpose of resetting the solenoid to a de-energized condition and hence causing reversal of the hydraulic flow and retracting the ram 14.

It is a feature of this invention that means are provided for controlling the pitch of the wound patterns upon the tube 38 to conform with the required standards of length of the container. In order to secure the necessary adjustment of pitch length or angle to conform with this requirement, means are provided in this embodiment whereby the helical lead or pitch of the wound tube is adjusted by varying the angle of inclination of the winding belts 4 which operate upon the base plies 1 and 2. As already stated it is a characteristic of spiral winding that a strip of paper applied after the formation of a base tube during the continued winding of such base tube will follow the angle behaviour of the strips in the base tube.

The means for setting the base ply pitch angle consist of a screw thread 41, engaged by a nut 42, this nut being rotatable within the housing 43 but incapable of axial movement thereto by virtue of collars 44 and 45. The nut is rotated by means of an electrical motor 46 through a gear box 47, causing advancement or retraction of the screw thread 41 relative to the nut. At one end of the screw thread 41 is an eye connection 48 pivotally mounted to a bracket 49, this bracket being attached to the pulley mounting base 50. The pulley mounting base 50 is capable of swinging about the pulley mounting midway between the winding pulleys 5 and 6 in the region of point 51. It follows that the nut of the electrical motor 46 will, through the intermediate mechanism just described, cause angular displacement of the winding belt 4 relative to the axis of the mandrel 3 with the result that the base plies 1 and 2 assume a modification of their angle of approach to the pitch of the relative base strips. This in turn affects the pitch of the pattern produced by pattern strip 8 when wound upon the base tube.

According to this embodiment of the invention, two photocell detectors 52 and 53 are spaced apart, the distance being equal to the desired pitch of the pattern or multiple of patterns and serving to measure the pitch condition in terms of the length prevailing.

Referring to FIGURE 1, it will be seen that if the two cutting points 9 and 10 arrive at the photocell detectors 52 and 53 at the same time, and the two detectors 52 and 53 are spaced in turn a distance equal to the pitch of the cutting points, it follows that the winding pitch is correct. Should the cutting point 10 arrive at the photocell detector 53 before the cutting point 9 arrives at the photocell 52, it follows that the pitch of the cutting points is too long. Alternatively, should the cutting point 9 arrive at the photocell detector 52 before the cutting point 10 arrives at the photocell 53, it follows that the pitch of the cutting points is too short.

Referring now to FIGURE 3, we see that the electrical motor 46 is controllable by two circuits in which only one circuit is capable of being in operation at any one time. Tube 38 is moving in the direction of arrow 7. The cutting lines 9 and 10 are approaching the photocell detectors 52 and 53. Should the cutting line 10 arrive at detector 53 before the cutting line 9 arrives at detector 52, the condition is such that the pitch of the pattern is too long. Photocell 53 will, through its associated amplifier 54 and current supply 55, cause solenoid 56 to influence contact 57 into engagement with switch point 58, creating an electrical pulse of short duration at the timing device 59. The timing device is of a type such that at receipt of the electrical pulse its output switch point 60 closes for a period determined by the setting of the timing device, causing solenoid 61 to be energized and switch pair 62 to close, energizing the electrical motor 46 for the period of the pre-set time value of the timer 59.

The energizing of solenoid 61 also opens switch 73. This switch 73 being in the same circuit as solenoid 65, when opened, isolates solenoid 65 thus preventing its being energized by any impulse subsequently received by amplifier 63 from photocell 52 during the term of energization of solenoid 61 as determined by the timer 59.

If the pitch of the pattern is too short, the electrical motor 46 will rotate in a direction directly opposite to that of the previous example, due to the following circuit operation taking place in a manner counterpart to that already described. Shortness of pattern pitch along the tube will result in the two control features 9 and 10 being too close and control feature 9 will arrive at photocell 52 before control feature 10 arrives at photocel 53. The impulse from photocell 52 will cause its associated amplifier to close its switch 63 for a short time, causing current supply 64 to energize solenoid 65, bringing contact 57 into engagement with switch point 66 and creating a short electrical pulse at the time device 67 and on receiving an electrical pulse its switch 68 closes for a period determined by the setting of the timing device, causing solenoid 69 to be energized and switch pair 70 to close, energizing the electric motor 46 for the period for which timer 67 has been pre-set, and causing motor 46 to rotate in the opposite direction to that previously described.

The energizing of solenoid 69 also opens switch 74. This switch 74 being in the same circuit as solenoid 56, when opened isolates solenoid 56 thus preventing its being energized by any impulse subsequently received by amplifier 54 from photocell 53 during the term of energization of solenoid 69 as determined by the timer 67.

The amplifiers 54 and 63 are of such a type that, having delivered the electrical pulse to the solenoids 56 and 65 respectively, according to whichever is energized, they will reset themselves. The contact 57 is biased by spring means 71 into a position approximately midway between the contacts 57 and 66 and remains in this position except when influenced by one or the other solenoids 56 and 65. The timing devices 59 and 67 are of such a type that they reset themselves into the inoperative condition after the duration of the energizing period for which they have been set.

It will be seen that the circuit of FIGURE 3 is one in which a correction of the pitch one way or the other can be made during each cutting cycle. It will be possible, of course, to arrange a neutral zone in the circuit which would not make a correction unless the pitch were outside a certain specified limit which, for example, might be the same as commercial tolerance.

The embodiment described observes the pitch of the wound patterns on the tube and adjusts the spiral angle to suit. In this embodiment the patern strip is observed simultaneously at two points at a distance from each other corresponding to the correct pitch length. These two observations are used by the machine as the basis for stabilizing the pitch. In the embodiment so far described the pitch of the wound patterns on the tube is observed, and adjustment made to the spiral angle to compensate for any condition of error in the pitch by itself. In this embodiment we have shown simultaneous observation of the pattern strip on the tube at two points at a distance from each other corresponding to the correct pitch length. These two observations are used by the machine as the basis for stabilizing the pitch. It should be understood that it is not always necessary for the two observation points to be spaced at a distance corresponding to the pitch of the patterns. They would be spaced at a distance corresponding to a multiple of pitches or at any convenient distance corresponding to the desired spacing of any two features on the tube, providing such features present themselves regularly for observation. It might be found that two suitable features occurred on the tube at a spacing equal to, say, 4.2 pitches, or any other suitable distance, or at a distance which equals only a fraction of a pitch length. The embodiment described in FIGURES 1, 2 and 3 shows only the simple case.

In the embodiment of FIGURES 1 to 3 the pitch is controlled to an independent standard such as the spacing of the two eyes. Having now described the means by which adjustment of the pitch can be obtained to enable the tube to be wound with patterns "pitched" at lengths close to the required standard, it remains only for the tubes to be cut off at the correct cutting points.

In the embodiments of FIGURES 4, 5, and 6 the pitch control is shown applied to a machine adapted for cutting fixed lengths measured from the end of the being-formed tube.

It will be seen that the basis of the problem involved in separation of the pitch error from the other winding and cutting errors is the relating of two polar opposite functions, namely, relating the pitch of the base tube to the cutting length or vice versa. To maintain long term cutting register one function or the other must be adjusted. If the relation of these two polar functions is not dealt with, the best one can hope for is short term cutting register and the possibility that the machine will have to be reset with loss of material.

We will now describe the embodiment of FIG. 4. The embodiment relates to method and apparatus for cutting lengths of spirally wound tube into precisely controlled lengths during the movement of the tube immediately after the forming operation. Although the drawing shows the use of a single saw for cutting off the lengths in repeated manner, it is within the scope of the invention for a gang of cutters to be used so that repeated cutting operations sever bites of multiples of tube lengths having the total length of each bite controlled in precise manner to a preset standard (FIG. 9). This is of great use *when* it is desired that all the constituent multiple tube lengths in each bite are to be of equal length with or without surplus space material.

In accordance with the invention this method is practiced by spirally winding the tube at a pre-determined axial speed, and moving cutting means axial of the tube from a position remote, in an axial sense, from the position where it is desired to cut the tube. The cutting means are moved at an axial speed relative to the tube but when they approach the axial position where it is desired to cut the tube, we substantially eliminate relative axial movement between the cutting means and the tube. This occurs when observation shows that the tube end is the required axial distance from the cutting means. Thereafter the being-formed tube is cut off. In FIG. 4 a cut off is shown in schematic form together with hydraulic traversing means for obtaining the required precisely controlled length of cutting, and also simple electrical circuitry controlling the operation.

Referring to the drawing, the tube 101 comprising one or more layers of strip material wound in spiral fashion is fed into the cut off means as shown in FIG. 1. Located adjacent to the tube 101 is the rotary saw 12 driven by an electric motor 13. The motor 13 is able to reciprocate lengthwise of the tube under the influence of the reciprocating rod 37 of an hydraulic cylinder 14. To cut the tube 101 it is necessary for the saw 12 to move transversely from the position shown in FIG. 4 into engagement with the tube 101. Such means are well known in the spiral tube making field.

The principle underlying the present invention is that when the tube intersects a beam of light between a primary light source 103 and a photocell 102 a sequence of operations begins. There is a secondary light source 104 attached to the motor 13 and moving therewith projected in a direction normal to the axis of the tube. It should be understood that it is required to cut lengths of tube exactly equal in length to the axial distance between saw 12 and the beam of light projected by the light source 104. The motor 13 has attached to it a bracket 121 carrying light source 104 and a photocell 105 to receive the light of light source 104 reflected from tube 101. In the construction shown means are provided whereby the light source 104 and photocell 105 are able to move at a slow speed relative to the axial speed of the tube. In other words, it advances toward the end of the tube in relatively slow fashion. This is achieved by permitting the reciprocation of saw 12 and the light source 104 and photocell 105 attached thereto to commence at a speed slightly in excess of the tube speed so as to gain relatively thereto and when the light beam from the light source 104 catches up with the end of the tube the speed of reciprocation is immediately reduced to equate with that of the tube. From there on the cutting operation takes place. The mechanism for achieving this relative speed is shown in FIG. 4. When the end of tube 101 interrupts this beam of light from source 103 the impulse from photocell 102 causes an amplifier 114 to close two switches, i.e., 113 and 120, hereinafter described. As the switch 113 closes it causes current to flow in solenoid 26 thereby retracting the solenoid and enabling hydraulic fluid to be admitted to the ram 29 in the manner heretofore described in connection with FIGS. 2 and 3. At the same time that switch 113 closes, a switch 120 closes a circuit connected with a further amplifier 116. This causes the associated light source 104 and photocell 105 of the amplifier 116 to be in operational condition. In other words, after the switch 120 closes, when the traverse of light source 4 and photocell 105 relative to the tube brings them to the end of the tube, modification of the beam of light from light source 104 causes completion of the circuit of photocell 105 closing switch 115 in amplifier 116. The switch 115 is normally open but when closed it energizes solenoid 122. This solenoid 122 is similar in design to solenoid 26 and is attached to a spool 123 of a solenoid valve 111. When solenoid 122 is energized its armature is retracted upwards modifying the flow circuitry of the hydraulic system for the period of energization of the solenoid 122.

Solenoid valve 111 is connected between hydraulic pump 106, and the supply line 36 leading to the solenoid valve 25 associated with the solenoid 26. Spool 123 is spring pressed downwards so that except when pulled upwardly by the solenoid 122 it permits the flow of liquid from pump 106 to the valve 25. Between the pump 106 and the valve 111 is a pressure-regulating valve 110 which has a bypass connection 107 to the return line 33 to the source of oil supply. The source of oil supply, which in FIG. 2 ran only to pump 22, has a branch connection 134 as well to a second pump 106 which is of variable capacity and is driven by motor 136 so that both pump 106 and pump 22 receive liquid from the oil supply 133. Pump 22 which is driven by motor 21 has an output connection to a pressure regulating valve 24. This is connected via the supply line 36 to the solenoid valve 25 as in FIG. 2 and also has a by-pass connection 135 to the return line 33.

It has already been mentioned that axial movement of the saw assembly is achieved by means of hydraulic cylinder 14, the details being shown in FIG. 2. As shown in FIG. 2 the hydraulic cylinder 14 is provided with ports 28 and 30 at its ends. These end ports are connected to ports 27 and 31 in the solenoid valve 25. The operation of the system of FIG. 4 in connection with FIG. 2 will now be set forth.

FIG. 4 shows the system at a moment when the cutting cycle is about to begin. When the end of the tube 101 intersects the light between light source 103 and photocell 102 the amplifier 114 closes normally-open switches 113 and 120 as previously described. Closing switch 113 activates solenoid 26 axially as it appears in FIGS. 2 and 4, displacing spool 35 of the solenoid valve 25 allowing the fluid supplied by pumps 22 and 106 to pass from the supply line 36 to the port 30 of the hydraulic cylinder 14 whereby the piston of the hydraulic cylinder is displaced thereby moving rod 37 and saw 12 axially of the tube.

As will be seen from FIG. 4 the supply of hydraulic fluid consists of a main component from pump 22 and an auxiliary component from pump 106. Pump 22 is adjusted so that its delivery moves the rod 37 and the saw 12 at the same axial speed as tube 101. The delivery of pump 106, on the other hand, is conveniently much less, and may be adjusted for example to the order of about 10 percent of delivery from pump 22. Thus the addition of pump 106 moves the saw faster than tube 101 by about this same proportion. The photocell 102 is positioned with respect to the tube 101 in such a way that axial movement of the saw does not occur until the desired cutting point has already passed the saw 12. On the other hand since the axial speed of the saw is slightly greater than the speed of the tube, the saw gains on the required cutting point on the tube.

As already mentioned, photocell 105 with its light source 104 are fixed to, and move with, the saw 12. When the photocell 105 reaches the end of the tube a signal is given by the photocell 105 to the second amplifier 116 thereby causing switches 115 to close. This in turn activates the auxiliary solenoid 122, closing solenoid valve 111 and diverting the auxiliary fluid from pump 106 into return line 33. Thus the speed of the saw is reduced to that of the tube 101 and relative motion between the two elements ceases.

Means are commonly known in the art whereby in the part of the cycle where there is no axial relative motion the cutting means are moved transversely into engagement with the tube causing the same to be cut, after which the cut length is removed or falls away.

Finally, toward the end of the cutting stroke, a striking member 39 attached to the saw carriage engages a double switch 40 which resets switches 115, 113 and 120. Details of the resetting circuitry are conventional.

Resetting switch 113 de-energizes solenoid 26 and resetting switch 115 de-energizes solenoid 122. De-energization of solenoid 26 and 122 allows the spools of the solenoid valves 25 and 111 to return to the position shown in FIG. 4 and direct fluid into the port 28 of the hydraulic cylinder 29, moving saw 12 back to its starting position.

The opening of switch 120 renders photocell 105 unresponsive to further impulses until a further tube end intersects the light beam between light source 103 and photocell 102 causing a new cutting cycle to be initiated.

Some time lag may be involved in the circuitry and therefore provision is preferably made for the photocell 105 and light source 104 to be adjusted from their nominal position relative to saw 12 to compensate for such lag. Similarly, photocell 102 and light source 103 are also preferably adjustable so that the amount of stroke during which relative movement of cutters and tube takes place is maintained within prescribed limits.

It is well known that errors of repetitive performance in combined circuitry such as is employed in this instance for initiating movement of the cutting means, where electrical relays, solenoid operated hydraulic valves and the like are employed, may be regarded as time errors, and the resulting space error, when applying such circuitry in determining the position of a moving element relative to a reference point, will be proportional to the time errors and to the speed of the moving element. Obviously, if the reference point from which such determination of position is made, moves at a speed slightly greater or slightly less than the moving element, whereby the relative speed of the reference point and the moving element is small the space error in determining the position of the moving element will be small. This advantage is gained over a situation where the reference point is fixed. Obviously this method can be used where it is desired to co-ordinate two independently operating elements having no physical connection.

Turning now to FIGS. 5 and 6, in these figures a flap 140 is set in the path of the advancing tube in such a manner that each time the tube end reaches the associated flap the switch allows current from a convenient electric supply to be applied to solenoid 26 causing a cutting cycle to be initiated.

FIGS. 5 and 6 show how a flap switch can be substituted for the primary photocell system, the flap switch serving to initiate the cutting cycle and energize the amplifier controlling the secondary photocell system which searches for the end of the tube during the period of time that there is a relative motion between the two parts.

It might be stated that the secondary photocell system can be replaced by suitable switches which search for the end of the tube during the period of relative motion.

In FIG. 5 we have shown the use of a flap and switch instead of the primary photocell system where the cutter traverses at a higher speed than the tube during the period of relative motion.

FIG. 6 illustrates the use of a flap switch similar to FIG. 5 except that in FIG. 6 the cutter traverses at a lower speed than the tube during the period of relative motion.

The invention has so far been described with reference to a system in which movement of the cutting device is commenced after the desired cutting point has moved past the cutting device and therefore in which the absolute speed of the cutting device is increased over the absolute speed of the tube to overtake the tube. It will be obvious to those skilled in the art that the movements of the cutting device can be commenced before the position of cut reaches the cutter with the cutter moving at a slower speed initially than the tube as shown in FIG. 6. Similarly, instead of increasing or decreasing the absolute speed of the cutters, the absolute speed of the tube may be varied to achieve the same effect.

FIGS. 7, 8 and 9 relate to a continuously reciprocating cut off 201 consisting of cutter mounting frame 202 having wheels 203 allowing the frame to be reciprocated with minimum friction, the wheel 203 being capable of rolling to and fro in tracks in the machine bed 204, under the influence of reciprocating mechanism. This reciprocating mechanism consists of a continuously rotating cam 205 mounted on the output shaft of a worm gear box 206 shown dotted. A roller cam follower 207 engages in a track in the cam 206, and is attached to one end of a horizontal link 208. The opposite end of the link 208 is pivotally and slidably mounted on a main lever 209. Intermediate the ends of the horizontal link 208 a support lever 210 is pivotally attached to the link 208 and the lower ends of levers 209 and 210 are both pivotally mounted at the bottom of the machine frame 204. The upper end of lever 209 has a trailing link 211 pivotally mounted thereto, the other end of trailing link 211 being mounted to an extension of the cutter mounting frame 202. Rotation of the cam 205 will produce reciprocation of the cutter mounting frame 202 in an axial sense. The track in cam 205 is of such a form as to produce acceleration of the cutter mounting frame 202 followed by a period of substantially constant speed after which the carriage slows down and returns to its starting point, this cycle being carried out continuously. The cutters are shown in diagrammatic form only and consist of a series of individual cutters 212 mounted on bars 213. Bars 213 are attached to the cutter mounting frame 202. Gang cutters are well known and it is not proposed to describe the method of producing the actual cutting other than to say that means normally associated with this type of machine are provided for bringing the cutters into engagement with the tube 214 during part of the constant speed region of the cutter stroke.

In this embodiment we provide means whereby the cut off will accurately determine the position of the end of the tube, and set the cutters 212 in a regular relationship thereto, thus enabling bites of tube of equal length to be cut off. Although we have shown a gang of cutters employed whereby the tube is simultaneously cut up into desired container lengths, it would be feasible to use only one cutter enabling single lengths of tube to be cut off.

For purposes of measuring the tube length and taking action therefrom, it is proposed to have a photoelectric cell 215 mounted on the cutter carriage together with a light source 216 in a position such that when reciprocation commences in the direction of tube movement and the constant speed region is reached, the photocell detector 215 is slightly ahead, say ½", of the tube end (FIG. 8). Means are provided whereby motion is then subtracted from the cutter cycle by means of a differential 217 interposed between the input shaft 218 of the worm gear box 206 and the variable speed unit 229. The third shaft of the differential has a motor 219 and reduction gear box 220 attached thereto, the motor 219 being under control of switch 221 and photocell 215. A projection 222 is attached to the periphery of cam 205 in such a position that when the constant speed region of the stroke has been reached the projection 222 strikes switch 221 (see FIG. 9) causing the self holding circuit of FIG. 8 to apply current to motor 219 thus causing the same to rotate in a direction which will subtract from the motion of the rotating cam 205. This will cause the cutters to "lose" relative to the motion of the tube until the tube intersects the beam of light between light source 216 and photocell 215 when an impulse will be provided to amplifier 223 causing the normally closed contacts 224 therein to open momentarily thus destroying the self holding state of the circuit and stopping rotation of motor 219. The cutters and the tube will now move along together at the same speed and when projection 222 strikes a further switch 225 the cutters will be moved transversely into engagement with the tube, dividing the same. Later, before the end of the constant speed region, projection 222 will strike further switch 226 causing the cutters to be withdrawn. It is usual for the switches 225 and 226 to operate solenoid valves in a pneumatic circuitry whereby a pneumatic cylinder causes in and out movement of the cutters.

In practice, in operating continuously reciprocating machines, means can be provided for adjusting the cutting stroke of the machine. In the embodiment shown in FIGS. 7, 8 and 9 this is achieved by adjusting the mounting of link 208 on the main lever 209 in FIG. 9. Here a simple adjustment slot 227 is provided, a pin connection between the two being clamped at a desired position in the slot 227 and for this purpose a hexagon nut is shown. The link 208 will of course be able to rotate freely about the pin. Suppose a tube of 36" length is to be cut off, the link 208 at this mounting of main lever 209 could conveniently be set at a value equal to 35½" of tube. The differential gear 217 and motor 219 then extract ½" equivalent motion from the cam movement, thus extending its cycle time. During the time when the motor 219 is rotating the relative speed between the cutters, together with the attached photocell 215, and the tube 214, would be quite slow so that the moment when the tube and the cutters are accurately disposed to each other can be accurately determined.

Referring to drawing, FIG. 7, it will be seen that conventional winding means are provided.

As an alternative to extracting motion from the cutting cycle the photoelectric cell could be set behind the end of the tube, and the cutter caused to gain on the tube until the light beam coincides with the end of the tube. For this purpose the cutter mechanism linkage would be set to a higher figure than the normal tube length, and the direction of the compensating motor 219 correspondingly changed.

As a further alternative, compensation could be applied through the winding mechanism so as to produce relative motion between the tube and the cutters. The principle is the same. In the first example, where the photocell is ahead of the tube the tube would be caused to gain temporarily until the light beam is interrupted by the tube end.

Referring to drawing, FIGS. 7 and 9, we show means which are in common use whereby the portion of the mandrel on which cutting takes place is rotatable and able to slide in telescopic fashion with the cutter carriage. This apparatus is commonplace in gang type cutting machines and need not be described in detail.

In these FIGS. 7 and 9, the main drive motor 228 serves to provide power for both the cut off and the winding unit. The variable speed unit 229 is commonly provided on machines of this type for obtaining the desired synchronism between traverse of the cutters and tube.

We will now describe the embodiment of FIG. 10. Here the cut off device is the same as that provided for FIGS. 7, 8 and 9, involving the same principles of differential and third shaft correction motor whereby the cutters are retarded until the desired space relationship is established with the tube in terms of length so that accurate lengths of tube are cut off.

The double electric eye system of FIGS. 1 and 3 is used for the purpose of stabilizing the pitch quality of the tube to a desired standard. The two electric eyes are indicated as 52 and 53 on FIGS. 1 and 3. The means for stabilizing the pitch are fully described above in connection with FIGS. 1 and 3. Even though cutting is initially occurring at the desired location there will develop a discrepancy between the cut and the pattern from the point of view of pattern register and further means have to be provided to compensate for this. A convenient method is that shown in drawing FIG. 10 where the patterned reel stock is moved in a direction axially of the tube thus adjusting the point of the application of the patterned material on the tube relative to the cutters. In this figure a hand wheel 230 is provided capable of adjusting the position of the reel bearing the pattern strip axially of the tube. This has the effect of changing the position longitudinally of the tube at which the pattern strip is wound on the tube. Should the development of error persist in one direction, there would obviously come a time when further moving of the web in the required direction would be impeded by the body of the machine, but it should be possible for a considerable number of tubes to be manufactured before this condition is reached.

As an alternative to moving the reel stock axially, means could be provided for moving the cutters on their mounting, relatively to the advancing tube in an axial sense. Once again the amount of adjustment available would be somewhat restricted.

It is not strictly necessary for the reel stand to be moved absolutely axially of the tube as it is sufficient if it has a component of motion in this direction. For instance, the reel stand could be moved in the direction along the axis of the reel or indeed in any direction except that of the web movement. The important point is that such movement should vary the point of application of the printed web axially of the tube relative to the cutters.

Having now shown how to stabilize the pitch of the wound patterns on the tube to conform with a desired independent standard, it is now proposed to show how by only slight re-arrangement of the control elements, a further system of pitch control can be obtained which is particularly suitable for use with machines cutting to a fixed length basis. Whilst this method now being described could be applied to any machine employing cutting means operating to a fixed length basis, it would enjoy particular advantage when the means for securing accurate length cutting shown in FIGURES 4, 5, 6, 7, 8 and 9 are employed. On such a machine adapted for cutting repeatedly accurate lengths of tube whether in single sticks each containing a multitude of container lengths or simultaneously cutting into the individual container lengths as provided for in the machine of FIGURE 9, the pitch control circuit of FIGURE 3 can be easily employed. The idea underlying this invention is that if the cutting machine maintains an accurate length of cut, and the tube is initially being cut in proper register, then any development of cutting error from there on is due to an error of pitch in the wound tube, and the resulting cumulative cutting misregister can be corrected by applying an adjustment of winding angle so as to produce a pitch variation of opposite sense to that which caused such misregister. In order to observe and act upon the variation of cutting register, it is proposed to observe the position of a control feature which may be part of the pattern, relative to the end of the tube. Any increase or decrease in distance of this control feature from the end of the tube will indicate that the pitch is too long or too short respectively.

Observation of the position of the control feature relative to the end of the tube may be effected by means of the two photocells shown in FIGURE 3 repositioned in the manner shown in FIGURE 11. The photocell 53 of FIGURE 3 is set in the path of the cut end of the tube so as to be able to observe the arrival of the cut end. The photocell 52 is set nearer to the source of tube supply at a distance from photocell 53 corresponding to the theoretical distance between the end of the tube and the reference feature 10 upon the tube. This reference feature may be in the form of a special control mark or alternatively may be a part of the pattern suitable for such observation.

Although we have shown the achievement of pitch stabilization or adjustment by variation of the spiral angle, an alternative method would be to use variation of stretch of the patterned strip in the manner of the application of Francis G. Glasby, Ser. No. 148,428, filed October 30, 1961. In this case pattern pitch on the tube in excess of or less than the desired standard may be compensated for by contracting or stretching the printed web before winding, in this way cancelling out in subsequent containers any error which has occurred.

In describing the use of the two electric eyes to correct the pitch, one eye is responsible for the "long pitch" circuit and the other for the "short pitch" circuit. One suitable arrangement would have the elecric eye closest to the source of wound tube control the "short pitch" circuit and the eye responsible for the other pitch circuit and the one farthest away from the source of wound tube would control the "long pitch" circuit.

The "long pitch" circuit, of course would initiate either a temporary or permanent contraction of the spiral helix while the "short pitch" circuit would be able to initiate a temporary or permanent increase of the spiral helix, both measured axially of the tube. Where we speak of the helical angle being adjusted temporarily, we mean that a short time after the adjustment is made the helical angle returns to its original setting. By permanent adjustment we mean that the spiral angle is adjusted to a new value and remains at that value until a further adjustment is made.

In some cases it might be found beneficial to apply both a temporary and a permanent adjustment simultaneously.

In FIGURES 3, 4, and 8 the electrical power supplies have been shown in the form of individual batteries for convenience only so that the functions of the circuits can be more easily understood. In practice it would be possible to use a mains electrical supply.

It should be understood that the control features on the tube for the various embodiments need not necessarily be in the form of printed marks suitable for photocell operation, but could take the form of perforations, raised embossings or depressions, magnetic indicia, or any suitable feature which can be detected. Appropriate sensing devices could be devised to use the various types of control feature and operate circuitry generally along the lines disclosed.

The embodiment of FIGURES 1 and 3 shows a preferred arrangement in which reference is made to two control features related to the wound patterns on the exterior of the tube for detecting variations in pitch from the desired standard. An alternative arrangement would be one in which one of the photocells observed a control feature on the patterned strip before winding. Conveniently for this purpose photocell 52 in FIGURE 1 could be used for pattern strip observation. The results achieved would be unlikely to achieve the accuracy of the arrangement shown in FIGURE 1 but would provide a usable method.

The embodiment of FIGURE 11 which shows a modification of the circuit of FIGURE 3 could also have its photocell 52 re-positioned so as to observe upon the patterned strip before winding though this arrangement is not regarded as possessing the advantages of the embodiment of FIGURE 11. The functions of the photocell 52 when operating upon the patterned strip before winding could be carried out by other devices which need not involve optical observation. For instance perforations could be provided in the patterned strip at positions related to the patterns thereon and such perforations could operate pneumatic devices associated with switch gear which would take the place of the photocell 52 and its associated amplifier 63. In a further arrangement the perforations could engage with a drum having matching projections on its periphery so that the drum rotates with a speed strictly related to the rate of consumption of the patterned strip. The drum could be fitted with a switch actuator capable of producing a pulse in strict relationship with the movement of the patterns, forming a substitute for the photocell 52 and its associated amplifier 63. These alterations are indicative only of the wide field of detection means which could be adopted to carry out the method of the invention.

Where, in the claims, we speak of winding the pattern strip on the outside we do not exclude having a transparent covering over the pattern strip through which the pattern strip can be seen.

What is claimed is:

1. A method of making containers with a unitary pattern strip spirally wound on the outside, comprising the steps of winding a tube on a mandrel with the pattern strip on the outside, detecting any error in pitch of the unitary pattern as wound on the mandrel, while the machine is running, by observing two points on the tube simultaneously at a predetermined distance from each other arithmetically related to the correct pitch length regardless of any other winding error and the step of correcting the pitch length by itself in accordance with said detected error; whereby the pitch quality of the tube is stabilized at a different time or place than any other winding error.

2. A method of making containers with a unitary pattern strip spirally wound on the outside, comprising the steps of winding a tube on a mandrel with the pattern strip on the outside, observing the tube, while the machine is running, simultaneously at two points spaced from each other a distance related to the correct pitch length and matching the cutting length of the spiral with the independent fixed standard determined by the two observation points separately from correction of any other winding error.

3. A method of making containers with a unitary pattern strip spirally wound on the outside in accordance with claim 1 in which a length of the individual pattern is varied within commercial tolerances to bring the pitch into registry with the container ends.

4. A method of making containers with a unitary pattern strip spirally wound on the outside according to claim 1 in which the adjustment of the spiral angle is obtained by moving axially the point at which the pattern strip is wound on the tube.

5. A method of making containers with a unitary pattern strip spirally wound on the outside according to claim 1 in which after the pitch angle has been adjusted, there is a step to correct any remaining winding errors at a point which in time or space is separate from the pitch error observation.

6. A method of making containers with a unitary pattern strip spirally wound on the outside according to claim 1 in which there is the step of cutting the tube into lengths, said step comprising moving cutting means from a point remote from the point from which it is desired to cut the tube axially of the tube at a speed relative to the tube such that said cutting means approach the position where it is desired to cut the tube, then cutting into lengths thereby eliminating any length cutting error.

7. A method of making containers with a unitary pattern strip spirally wound on the outside, comprising the steps of winding a tube on a mandrel with the pattern strip on the outside, detecting any error in pitch of the unitary pattern as wound on the mandrel by observing, while the machine is running, at two points on the tube simultaneously at a distance from each other corresponding to the correct distance between the two points and adjusting the spiral angle from such observations so as to stabilize the pitch quality of the tube.

8. A method of making containers with a unitary pattern strip spirally wound on the outside comprising the steps of winding a tube on a mandrel with the pattern strip on the outside, and repeatedly cutting off fixed lengths of patterned tube as it is formed, each length corresponding to the correct dimensions of repeated groupings of patterns, detecting any error in pitch of the unitary patterns as wound on the mandrel by observing two points on the tube simultaneously at a distance from each other corresponding to the correct distance between the two points, adjusting the spiral angle accordingly so as to stabilize the pitch of the patterns thereby bringing the grouping of patterns into register with the two ends of the lengths of tube whereby the unitary patterns are substantially undamaged by the fixed length cut-offs.

9. A method of making containers with a unitary pattern strip spirally wound on the outside comprising the steps of winding a tube on a mandrel with the pattern strip on the outside, and repeatedly cutting off fixed lengths of patterned tube as it is formed, each length corresponding to the correct dimension of repeated patterns or groupings of patterns, detecting any error in pitch of the unitary patterns as wound on the mandrel by observing at two points spaced from each other a distance corresponding to the correct spacing of a pattern feature from the end of the tube, one observation being taken at the end of the tube and the other observation being on the pattern feature, adjusting the spiral angle accordingly so as to stabilize the pitch of the patterns thereby bringing the patterns into register with the two ends of the lengths of tube.

10. A method of making containers with a unitary pattern strip spirally wound on the outside comprising the steps of winding a tube on a mandrel with the pattern strip on the outside, observing the tube simultaneously at two points spaced from each other a distance corresponding to the correct spacing of a pattern feature from the end of the tube, one observation being taken at the end of the tube and the other observation being on the pattern feature, repeatedly cutting off fixed lengths of tube each length being such as to contain an exact number of correct unitary patterns and varying the pitch of the windings in opposite sense to that of any pitch error indicated by variation of the distance of the pattern feature from the end of the tube, as observed at the two correctly spaced points whereby the lengths of tube cut off contain unitary patterns in correct relation with the cut ends of the tube.

11. A method according to claim 10 wherein observation of the pattern feature takes place on the patterned strip before winding on the mandrel.

12. An apparatus for making containers with a unitary pattern strip spirally wound on the outside, comprising a mandrel, means for continuously winding a tube on the mandrel with the pattern strip on the outside, means for observing the tube simultaneously, while the machine is running, at two points spaced from each other a distance related to the correct pitch length of one pattern strip, in combination with means for adjusting any pitch error on the basis of such observations.

13. An apparatus for making containers with a unitary pattern strip spirally wound on the outside in accordance with claim 12 in which there are also means for correcting any winding errors other than pitch errors, said other correcting means being located at a point after the point of pitch error correction.

14. An apparatus for making containers with a unitary pattern strip spirally wound on the outside, comprising a mandrel, means for continuous winding of a tube on the mandrel with the pattern strip on the outside, means for observing the tube simultaneously, while the machine is running, at two points spaced from each other a distance corresponding to the correct pitch length of the wound pattern strip, in combination with means for correcting any pitch error on the basis of such observations.

15. An apparatus for making containers with a unitary pattern strip spirally wound on the outside comprising a mandrel, means for continuous winding of the tube on the mandrel with the pattern strip on the outside, means for repeatedly cutting off fixed lengths of patterned tube as it is formed, means for detecting any error in pitch of the unitary patterns by observing at two points spaced from each other a distance corresponding to the correct spacing of a pattern feature from the end of the tube, while the machine is running, one observation being taken at the end of the tube and the other observation being on the pattern feature, means activated by the error detecting means for adjusting the spiral angle so as to stabilize the pitch of the patterns thereby bringing the patterns into register with the two ends of the lengths of tube.

16. A method of making containers with a unitary pattern strip spirally wound on the outside by measuring the pitch of the pattern separately from other errors, comprising the steps of winding a tube on a mandrel with the pattern strip on the outside, detecting the pitch of the unitary pattern as wound on the mandrel, while the machine is running, by simultaneously observing two points on the tube at a distance from each other solely related to the pitch length, one point being at an end of the container and the other at the winding point of the strip, followed by the step of comparing the desired length of container to the detected pitch length and adjusting the factors of desired container length and pitch length till they correspond; whereby the pitch of the pattern strip is stabilized separately from all other winding errors.

17. A method of making containers with a unitary pattern strip spirally wound on the outside, comprising the steps of winding a tube on a mandrel with the pattern strip on the outside, detecting the pitch of the unitary pattern as wound on the mandrel separately from other errors while the machine is running, one of the points of observation being at an end of the container, and thereafter adjusting the pitch length to match the predetermined desired length of container measured from the end of the latter; whereby the pitch of the pattern strip is stabilized to match a predetermined container length.

References Cited in the file of this patent
UNITED STATES PATENTS

| | | |
|---|---|---|
| 2,168,203 | Green | Aug. 1, 1939 |
| 2,623,443 | Robinson | Dec. 20, 1952 |
| 2,699,099 | Robinson | Jan. 11, 1955 |
| 2,734,432 | Robinson et al. | Feb. 14, 1956 |
| 2,988,292 | Bliss | June 13, 1961 |